US010227462B2

(12) United States Patent
Abusleme et al.

(10) Patent No.: US 10,227,462 B2
(45) Date of Patent: Mar. 12, 2019

(54) FLUOROPOLYMER FILM

(71) Applicants: SOLVAY SA, Brussels (BE); CENTRE NATIONAL DE LA RECHERCHE SCIENTIFIQUE, Paris (FR)

(72) Inventors: Julio A. Abusleme, Saronno (IT); Jean Le Bideau, Nantes (FR); Aurélie Guyomard-Lack, Beaucouzé (FR); Dominique Guyomard, Sautron (FR); Bernard Lestriez, Nantes (FR)

(73) Assignees: SOLVAY SA, Brussels (BE); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 258 days.

(21) Appl. No.: 14/395,852

(22) PCT Filed: Apr. 22, 2013

(86) PCT No.: PCT/EP2013/058283
§ 371 (c)(1),
(2) Date: Oct. 21, 2014

(87) PCT Pub. No.: WO2013/160240
PCT Pub. Date: Oct. 31, 2013

(65) Prior Publication Data
US 2015/0140473 A1    May 21, 2015

(30) Foreign Application Priority Data

Apr. 23, 2012  (EP) .................................... 12305471

(51) Int. Cl.
*H01M 10/0565* (2010.01)
*H01M 10/0567* (2010.01)
*H01M 10/0569* (2010.01)
*H01M 8/10* (2016.01)
*C09K 9/00* (2006.01)
(Continued)

(52) U.S. Cl.
CPC ................... *C08J 5/18* (2013.01); *C09K 9/02* (2013.01); *H01G 9/2009* (2013.01); *H01M 8/1023* (2013.01); *H01M 8/1037* (2013.01); *H01M 8/1039* (2013.01); *H01M 8/1044* (2013.01); *H01M 8/1048* (2013.01); *H01M 8/1051* (2013.01); *H01M 10/0565* (2013.01); *H01M 10/0567* (2013.01); *H01M 10/0569* (2013.01); *C08J 2327/16* (2013.01); *G02F 2001/1519* (2013.01); *H01M 2008/1095* (2013.01); *H01M 2300/0045* (2013.01); *H01M 2300/0082* (2013.01); *Y02E 10/542* (2013.01); *Y02P 70/521* (2015.11); *Y02P 70/56* (2015.11)

(58) Field of Classification Search
CPC ........... C09K 9/02; C08J 5/18; H01G 9/2009; H01M 8/1023; H01M 8/1037; H01M 8/1039; H01M 8/1044; H01M 8/1048; H01M 8/1051; H01M 10/0565; H01M 10/0567; H01M 10/0569
USPC .................. 429/516, 316; 264/299; 524/104
See application file for complete search history.

(56) References Cited

U.S. PATENT DOCUMENTS

| 5,726,247 | A | 3/1998 | Michalczyk et al. |
| 6,203,944 | B1 | 3/2001 | Turner et al. |
| 2007/0099051 | A1 | 5/2007 | Hocevar et al. |
| 2012/0021279 | A1 | 1/2012 | Le Bideau et al. |

FOREIGN PATENT DOCUMENTS

| CN | 102130364 A | 7/2011 |
| JP | 2007511873 A | 5/2007 |

(Continued)

OTHER PUBLICATIONS

Doyle, M., Choi, S. K., and Proulx, G., High-Temperature Proton Conducting Membranes Based on Perfluorinated Ionomer Membrane-Ionic Liquid Composites, Journal of the Electrochemical Society, 147, (1), (2000).pp. 34-37.*
Kickelbick G., "Concepts for the incorporation of inorganic building blocks into organic polymers on a nanoscale", Progress in Polymer Science, Pergamon Press, Oxford, GB, Jan. 1, 2003, vol. 28, No. 1, pp. 83-114, XP027512130, ISSN: 0079-6700, DOI: 10.1016/S0079-6700(02)00019-9 [retrieved on Jan. 1, 2003].
Souzy R. et al., "Functional fluoropolymers for fuel cell membranes", Progress in Polymer Science, Pergamon Press, Oxford, GB, vol. 30, No. 6, Jun. 1, 2005 (Jun. 1, 2005), pp. 644-687, XP027691361, ISSN: 0079-6700 [retrieved on Jun. 1, 2005].

*Primary Examiner* — Kelechi C Egwim

(57) ABSTRACT

The invention pertains to a process for manufacturing a fluoropolynner film comprising a fluoropolymer hybrid organic/inorganic composite, said process comprising the following steps: (i) providing a mixture of: —at least one fluoropolymer [polymer (F)]; —at least one metal compound [compound (M)] having formula: $X_{4-m}AY_m$ wherein m is an integer from 1 to 4, A is a metal selected from the group consisting of Si, Ti and Zr, Y is a hydrolysable group and X is a hydrocarbon group, optionally comprising one or more functional groups; —a liquid medium consisting essentially of at least one ionic liquid (IL) and, optionally, at least one additive (A); —optionally, at least one electrolytic salt (ES); and —optionally, at least one organic solvent (S); (ii) hydrolyzing and/or polycondensing said compound (M) to yield a liquid mixture comprising fluoropolymer hybrid organic/inorganic composite comprising inorganic domains and incorporating said liquid medium; (iii) processing a film from the liquid mixture obtained in step (ii); and (iv) drying and then, optionally, curing the film obtained in step (iii) for obtaining the fluoropolymer film. The invention also pertains to the fluoropolymer film obtained from said process and to use of said fluoropolymer film in electrochemical and photo-electrochemical devices.

19 Claims, No Drawings

(51) Int. Cl.
  *G02F 1/00* (2006.01)
  *H01G 9/20* (2006.01)
  *C08J 5/18* (2006.01)
  *H01M 8/1023* (2016.01)
  *H01M 8/1037* (2016.01)
  *H01M 8/1039* (2016.01)
  *H01M 8/1044* (2016.01)
  *H01M 8/1048* (2016.01)
  *H01M 8/1051* (2016.01)
  *C09K 9/02* (2006.01)
  *G02F 1/15* (2006.01)
  *H01M 8/1018* (2016.01)

(56) References Cited

FOREIGN PATENT DOCUMENTS

| | | |
|---|---|---|
| WO | 0003444 A1 | 1/2000 |
| WO | 2011121078 A1 | 10/2011 |
| WO | WO 2011121078 A1 * 10/2011 | ................ C08F 8/00 |

* cited by examiner

FLUOROPOLYMER FILM

This application is a U.S. national stage entry under 35 U.S.C. § 371 of International Application No. PCT/EP2013/058283 filed Apr. 22, 2013, which claims priority to European application No. 12305471.0 filed on Apr. 23, 2012. The entire contents of these applications are explicitly incorporated herein by this reference.

TECHNICAL FIELD

The invention pertains to a process for the manufacture of a fluoropolymer film, to the fluoropolymer film obtained therefrom and to use of said fluoropolymer film in electrochemical and photo-electrochemical devices.

BACKGROUND ART

Fluoropolymers, and in particular, vinylidene fluoride polymers, have been used with success in a wide variety of applications including electrochemical applications.

In particular, fluoropolymers are used as raw materials for polymer membranes for use in electrochemical devices such as secondary batteries because of their chemical and thermal aging resistance.

A metal ion secondary battery is typically formed by assembling a positive electrode (anode), a ion conducting membrane and a negative electrode (cathode); the ion conducting membrane, often referred to as separator, plays a crucial role in the cell, as it must provide ionic conductivity while ensuring effective separation between the opposite electrodes.

Basically, two types of separators can be used: either porous ones, wherein a solution of an electrolyte in a suitable solvent fills the porosity of the separator, or non-porous ones, which are generally either pure solid polymer electrolytes (i.e. electrolytes dissolved in a high molecular weight polyether host, like PEO and PPO, which acts as solid solvent) or gelled polymer electrolyte systems, which incorporate into a polymer matrix a plasticizer or solvent capable of forming a stable gel within the polymer host matrix and an electrolyte.

Nevertheless, gelled polymer electrolytes might not incorporate and retain the liquid plasticizer/electrolyte solution in an effective manner during both manufacturing of the battery and operations of the same, and/or might not possess suitable mechanical properties as required for effective separation of the electrodes.

On the other side, hybridization of organic and inorganic compounds is an important and evolutionary way to create polymeric compounds having, notably, enhanced mechanical properties. To elaborate such organic-inorganic polymer hybrids, sol-gel processes using metal alkoxides is the most useful and important approach. By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds.

Within this scenario, WO 2011/121078 (SOLVAY SOLEXIS S.P.A.) Oct. 6, 2011 discloses certain fluoropolymer-based hybrid organic/inorganic composites wherein covalent bonds connect fluoropolymer chains to the inorganic domains, said composites being obtained by a process involving the reaction of certain functional fluoropolymers possessing hydroxyl groups with certain hydrolysable compounds of Si, Ti, or Zr, and subsequent hydrolysis and polycondensation of said compounds. This patent document also mentions that the so obtained hybrid organic/inorganic composites can be notably used for the manufacture of membranes for electrochemical applications, and more particularly as separators for lithium ion batteries. Thus, certain embodiments have been exemplified in such patent document, wherein films made of the mentioned hybrid organic/inorganic composites were swelled with an electrolyte solution comprising a solvent (mixture of ethylene carbonate and propylene carbonate) and an electrolyte ($LiPF_6$). Nevertheless, once the film has been casted, swelling it again with an electrolyte solution is not an easy task, so that final amount of electrolyte solution actually interpenetrated in the separator is relatively low, so as, consequently, the ionic conductivity.

Ionic liquids are formed by the combination of cations and anions and are in the liquid state at temperatures close to ambient temperature. They have remarkable properties such as non-volatility, high ionic conductivity as well as catalytic properties. They are currently used in a wide variety of fields, in particular as electrolytes.

For instance, ion-conducting gels in solid form have been described in US 2012/0021279 (CENTRE NATIONAL DE LA RECHERCHE SCIENTIFIQUE) Jan. 26, 2012, wherein they are obtained by mixing an ionic liquid with at least one sol-gel precursor containing at least one hydrolysable group. The ion-conducting gels so obtained are continuous films, are stable up to temperatures of approximately 250° C., are transparent, are electrical insulators and are ionic conductors.

Although these ion-conducting gels have many useful properties, their use as electrolytes has many drawbacks due to their low mechanical strength.

SUMMARY OF INVENTION

The Applicant has now surprisingly found that it is possible to manufacture fluoropolymer films based on a hybrid organic/inorganic composite having improved mechanical integrity while exhibiting outstanding ionic conductivity.

It is thus an object of the present invention a process for manufacturing a fluoropolymer film comprising a fluoropolymer hybrid organic/inorganic composite, said process comprising the following steps:
(i) providing a mixture of:
at least one fluoropolymer [polymer (F)];
at least one metal compound [compound (M)] having formula:

$$X_{4-m}AY_m$$

wherein m is an integer from 1 to 4, A is a metal selected from the group consisting of Si, Ti and Zr, Y is a hydrolysable group and X is a hydrocarbon group, optionally comprising one or more functional groups;
a liquid medium consisting essentially of at least one ionic liquid (IL) and, optionally, at least one additive (A);
optionally, at least one electrolytic salt (ES); and
optionally, at least one organic solvent (S);
(ii) hydrolysing and/or polycondensing said compound (M) to yield a liquid mixture comprising fluoropolymer hybrid organic/inorganic composite comprising inorganic domains and incorporating said liquid medium;
(iii) processing a film from the liquid mixture obtained in step (ii); and (iv) drying and then, optionally, curing the film obtained in step (iii) for obtaining the fluoropolymer film.

It has been surprisingly found that, when the manufacture of the fluoropolymer hybrid organic/inorganic composite is carried out in the presence of the liquid medium, a self-standing fluoropolymer film stably comprising and retaining said liquid medium can be obtained, such fluoropolymer film exhibiting enhanced mechanical integrity and outstanding ionic conductivity while being advantageously optically transparent to solar radiation.

Another object of the present invention is the fluoropolymer film which can be obtained by the process as defined above.

Thus, the invention further pertains to a fluoropolymer film comprising a fluoropolymer hybrid organic/inorganic composite, said hybrid being obtainable by a process comprising hydrolysing and/or polycondensing a mixture comprising:
- at least one fluoropolymer [polymer (F)];
- at least one metal compound [compound (M)] having formula:

wherein m is an integer from 1 to 4, A is a metal selected from the group consisting of Si, Ti and Zr, Y is a hydrolysable group and X is a hydrocarbon group, optionally comprising one or more functional groups;
- a liquid medium consisting essentially of at least one ionic liquid (IL) and, optionally, at least one additive (A);
- optionally, at least one electrolytic salt (ES); and
- optionally, at least one organic solvent (S).

It has been found that the fluoropolymer film of the present invention is endowed with enhanced mechanical integrity so as to advantageously withstand mechanical stresses typical of the final intended use, in particular in electrochemical and photo-electrochemical applications.

The fluoropolymer film of the present invention is advantageously endowed with enhanced flexibility and enhanced elongation at break so as to successfully withstand high pulling or stretching forces without failure.

The flexibility of the fluoropolymer film is a measure of its ability to deform elastically and return to its original shape when the applied stress is removed.

The elongation at break of the fluoropolymer film is a measure of the percentage increase in length that occurs before it breaks under the applied tensile stress.

It has been also found that the fluoropolymer film of the present invention is advantageously optically transparent to solar radiation so that it can be successfully used in photo-electrochemical applications.

By the term "fluoropolymer [polymer (F)]", it is hereby intended to denote a fluoropolymer comprising recurring units derived from at least one ethylenically unsaturated monomer comprising at least one fluorine atom.

The polymer (F) optionally comprises recurring units derived from at least one (meth)acrylic monomer [monomer (MA)] having formula (I):

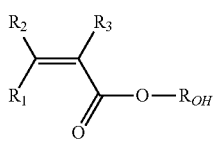

(I)

wherein each of $R_1$, $R_2$, $R_3$, equal to or different from each other, is independently a hydrogen atom or a $C_1$-$C_3$ hydrocarbon group and $R_{OH}$ is a $C_1$-$C_5$ hydrocarbon moiety comprising at least one hydroxyl group.

The term "at least one (meth)acrylic monomer (MA)" is understood to mean that the polymer (F) may comprise recurring units derived from one or more than one (meth)acrylic monomer (MA) as defined above. In the rest of the text, the expressions "(meth)acrylic monomer (MA)" and "monomer (MA)" are understood, for the purposes of the present invention, both in the plural and the singular, that is to say that they denote both one or more than one (meth)acrylic monomer (MA) as defined above.

The polymer (F) preferably comprises at least 0.05% by moles, more preferably at least 0.1% by moles, even more preferably at least 0.2% by moles of recurring units derived from said monomer (MA) having formula (I) as defined above.

The polymer (F) preferably comprises at most 10% by moles, more preferably at most 7.5% by moles, even more preferably at most 5% by moles, most preferably at most 3% by moles of recurring units derived from said monomer (MA) having formula (I) as defined above.

Determination of average mole percentage of monomer (MA) recurring units in polymer (F) can be performed by any suitable method. Mention can be notably made of acid-base titration methods, well suited e.g. for the determination of the acrylic acid content, of NMR methods, adequate for the quantification of monomers (MA) comprising aliphatic hydrogen atoms in side chains, of weight balance based on total fed monomer (MA) and unreacted residual monomer (MA) during polymer (F) manufacture.

The monomer (MA) preferably complies with formula (II):

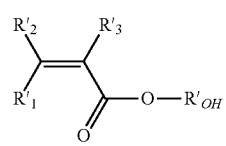

(II)

wherein $R'_1$, $R'_2$ and $R'_3$ are hydrogen atoms and $R'_{OH}$ is a $C_1$-$C_5$ hydrocarbon moiety comprising at least one hydroxyl group.

Non-limitative examples of suitable monomers (MA) include, notably, hydroxyethyl (meth)acrylate, hydroxypropyl(meth)acrylate; hydroxyethylhexyl(meth)acrylates.

The monomer (MA) is more preferably selected among the followings:

hydroxyethylacrylate (HEA) of formula:

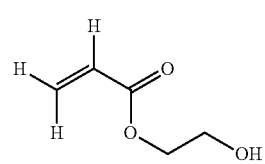

2-hydroxypropyl acrylate (HPA) of either of formulae:

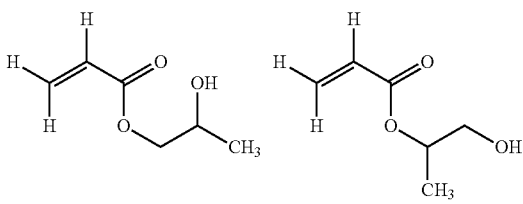

and mixtures thereof.

The monomer (MA) is even more preferably HPA and/or HEA.

The polymer (F) is preferably a hydrogen-containing fluoropolymer comprising:
  recurring units derived from at least one ethylenically unsaturated monomer comprising at least one fluorine atom (hereinafter, fluorine-containing monomer); and
  optionally, recurring units derived from at least one ethylenically unsaturated monomer comprising at least one hydrogen atom (hereinafter, hydrogen-containing monomer).

The fluorine-containing monomer and the hydrogen-containing monomer may be the same monomer or may be different monomers.

Non-limitative examples of suitable fluorine-containing monomers include, notably, the followings:
  $C_3$-$C_8$ perfluoroolefins, such as tetrafluoroethylene and hexafluoropropene;
  $C_2$-$C_8$ hydrogenated fluoroolefins, such as vinyl fluoride, 1,2-difluoroethylene, vinylidene fluoride and trifluoroethylene;
  perfluoroalkylethylenes complying with formula $CH_2=CH-R_{f0}$, in which $R_{f0}$ is a $C_1$-$C_6$ perfluoroalkyl;
  chloro- and/or bromo- and/or iodo-$C_2$-$C_6$ fluoroolefins, like chlorotrifluoroethylene;
  (per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;
  $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
  (per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;
  functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
  fluorodioxoles, especially perfluorodioxoles.

Non-limitative examples of suitable hydrogen-containing monomers include, notably, the followings:
  $C_2$-$C_8$ hydrogenated fluoroolefins, such as vinyl fluoride, 1,2-difluoroethylene, vinylidene fluoride and trifluoroethylene;
  perfluoroalkylethylenes complying with formula $CH_2=CH-R_{f0}$, in which $R_{f0}$ is a $C_1$-$C_6$ perfluoroalkyl;
  non-fluorinated monomers such as ethylene, propylene, vinyl monomers such as vinyl acetate, acrylic monomers, like methyl methacrylate, butyl acrylate, as well as styrene monomers, like styrene and p-methylstyrene.

The polymer (F) comprises preferably more than 1% by moles, preferably more than 5% by moles, more preferably more than 10% by moles of recurring units derived from at least one hydrogen-containing monomer.

The polymer (F) comprises preferably more than 25% by moles, preferably more than 30% by moles, more preferably more than 40% by moles of recurring units derived from at least one fluorine-containing monomer.

The fluorine-containing monomer can further comprise one or more other halogen atoms (Cl, Br, I). Should the fluorine-containing monomer be free of hydrogen atoms, it is designated as per(halo)fluoromonomer. Should the fluorine-containing monomer comprise at least one hydrogen atom, it is designated as hydrogen-containing fluorinated monomer.

Should the fluorine-containing monomer be a hydrogen-containing fluorinated monomer, such as for instance vinylidene fluoride, trifluoroethylene, vinylfluoride, the hydrogen-containing fluoropolymer of the invention can be either a polymer comprising recurring units derived only from said hydrogen-containing fluorinated monomer or it can be a copolymer comprising recurring units derived from said hydrogen-containing fluorinated monomer and from at least one other monomer.

Should the fluorine-containing monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from said monomer (MA), recurring units derived from said per(halo)fluoromonomer and from at least one other hydrogen-containing monomer different from said monomer (MA), such as for instance ethylene, propylene, vinylethers, acrylic monomers, vinylidene fluoride, trifluoroethylene, vinylfluoride.

Preferred polymers (F) are those wherein the fluorine-containing monomer is chosen from the group consisting of tetrafluoroethylene (TFE), vinylidene fluoride (VDF) and chlorotrifluoroethylene (CTFE).

The polymer (F) is more preferably selected from the group consisting of:
  polymers (F-1) comprising recurring units derived from at least one per(halo)fluoromonomer selected from TFE and CTFE and from at least one hydrogenated comonomer selected from ethylene, propylene and isobutylene, optionally containing one or more additional comonomers, typically in amounts of from 0.1% to 30% by moles, based on the total amount of TFE and/or CTFE and said hydrogenated comonomer(s); and
  polymers (F-2) comprising recurring units derived from VDF and, optionally, from one or more fluorine-containing monomers different from VDF.

Polymers (F-1) and polymers (F-2) optionally comprise recurring units derived from at least one (meth)acrylic monomer [monomer (MA)] having formula (I) as defined above.

The polymer (F) is even more preferably selected from polymers (F-2) as defined above.

The polymer (F) is most preferably selected from polymers (F-2) further comprising recurring units derived from at least one (meth)acrylic monomer [monomer (MA)] having formula (I) as defined above.

In polymers (F-1) as defined above, the molar ratio per(halo)fluoromonomer(s)/hydrogenated comonomer(s) is typically of from 30:70 to 70:30. In polymers (F-1) as defined above, the hydrogenated comonomer preferably comprises ethylene, optionally in combination with other hydrogenated comonomers.

Polymers (F-1) wherein the per(halo)fluoromonomer is predominantly CTFE only will be identified herein below as ECTFE copolymers; polymers (F-1) wherein the per(halo)fluoromonomer is predominantly TFE only will be identified herein below as ETFE copolymers.

The ECTFE and/or ETFE copolymers (F-1) preferably comprise:
(a) from 35% to 65%, preferably from 45% to 55%, more preferably from 48% to 52% by moles of ethylene (E);
(b) from 65% to 35%, preferably from 55% to 45%, more preferably from 52% to 48% by moles of at least one of chlorotrifluoroethylene (CTFE) and tetrafluoroethylene (TFE) or mixture thereof;
(c) from 0.05% to 10%, preferably from 0.1% to 7.5%, more preferably from 0.2% to 5.0% by moles of (meth)acrylic monomer (MA) having formula (I) as defined above.

Among polymers (F-1), ECTFE polymers are preferred.

The polymers (F-2) preferably comprise:
(a') at least 60% by moles, preferably at least 75% by moles, more preferably at least 85% by moles of vinylidene fluoride (VDF);
(b') optionally, from 0.1% to 15% by moles, preferably from 0.1% to 12% by moles, more preferably from 0.1% to 10% by moles of a fluorinated comonomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.05% to 10% by moles, preferably from 0.1% to 7.5% by moles, more preferably from 0.2% to 3.0% by moles of (meth)acrylic monomer (MA) having formula (I) as defined above.

According to an embodiment of the present invention, when the polymer (F) comprises recurring units derived from at least one monomer (MA) having formula (I) as defined above, the polymer (F) in the fluoropolymer film is a grafted fluoropolymer [polymer (Fg)] comprising pendant groups having formula $—Y_{m-1}AX_{4-m}$, wherein m, Y, A and X have the same meaning as defined above.

It is understood that, when the polymer (F) comprises recurring units derived from at least one monomer (MA) having formula (I) as defined above, at least a fraction of hydroxyl groups of the $R_{OH}$ functionalities of said monomer (MA) of said polymer (F) is reacted with at least a fraction of the hydrolysable group(s) Y of said compound (M) so as to yield a covalent bond between the monomer (MA) moiety and the compound (M) moiety.

The metal compound (M) [compound (M)] of formula $X_{4-m}AY_m$ can comprise one or more functional groups on any of groups X and Y, preferably on at least one group X.

In case compound (M) comprises at least one functional group, it will be designated as functional compound (M); in case none of groups X and Y comprises a functional group, compound (M) will be designated as non-functional compound (M).

Functional compounds (M) can advantageously provide for a fluoropolymer film comprising a fluoropolymer hybrid organic/inorganic composite having functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

To the aim of obtaining fluoropolymer films based on fluoropolymer hybrid organic/inorganic composites having functional groups, it is generally preferred that any of groups X of compound (M) of formula $X_{4-m}AY_m$ comprises one or more functional groups and that m is an integer of 1 to 3, so that advantageously each A atom, after complete hydrolysis and/or polycondensation, will nevertheless be bound to a group comprising a functional group.

With the aim of manufacturing fluoropolymer films based on fluoropolymer hybrid organic/inorganic composites which can exhibit functional behaviour in terms of hydrophilicity or ionic conductivity, functional group of compound (M) will be preferably selected among carboxylic acid group (in its acid, anhydride, salt or halide form), sulphonic group (in its acid, salt or halide form), phosphoric acid group (in its acid, salt, or halide form), amine group, and quaternary ammonium group; most preferred will be carboxylic acid group (in its acid, anhydride, salt or halide form) and sulphonic group (in its acid, salt or halide form).

The selection of the hydrolysable group Y of the compound (M) is not particularly limited, provided that it enables in appropriate conditions formation of a —O—A≡ bond; said hydrolysable group can be notably a halogen (especially a chlorine atom), a hydrocarboxy group, a acyloxy group or a hydroxyl group.

The metal compound [compound (M)] preferably complies with formula:

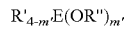

$$R'_{4-m'}E(OR'')_{m'}$$

wherein m' is an integer from 1 to 4, and, according to certain embodiments, from 1 to 3, E is a metal selected from the group consisting of Si, Ti and Zr, and R' and R", equal to or different from each other and at each occurrence, are independently selected from $C_1$-$C_{18}$ hydrocarbon groups, optionally comprising one or more functional groups.

The metal compound [compound (M)] more preferably complies with formula:

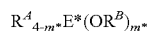

$$R^A_{4-m*}E^*(OR^B)_{m*}$$

wherein m* is an integer from 2 to 3, E* is a metal selected from the group consisting of Si, Ti and Zr, $R^A$, equal to or different from each other at each occurrence, is a $C_1$-$C_{12}$ hydrocarbon group, optionally comprising one or more functional group, and $R^B$, equal to or different from each other at each occurrence, is a $C_1$-$C_5$ linear or branched alkyl radical, preferably $R^B$ is methyl or ethyl.

Examples of functional compounds (M) are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

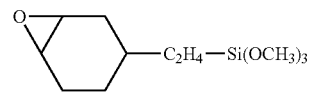

glycidoxypropylmethyldiethoxysilane of formula:

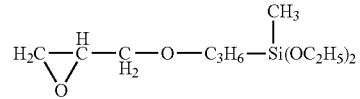

glycidoxypropyltrimethoxysilane of formula:

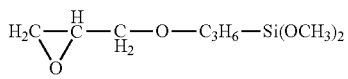

methacryloxypropyltrimethoxysilane of formula:

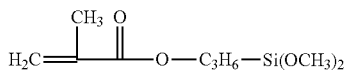

aminoethylaminpropylmethyldimethoxysilane of formula:

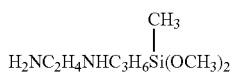

aminoethylaminpropyltrimethoxysilane of formula:

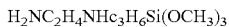

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

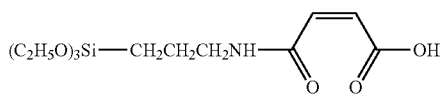

3-(trihydroxysilyl)-1-propane-sulphonic acid of formula $HOSO_2-CH_2CH_2CH_2-Si(OH)_3$, N-(trimethoxysilylpropyl)ethylene-diamine triacetic acid, and its sodium salts, 3-(triethoxysilyl)propylsuccinic anhydride of formula:

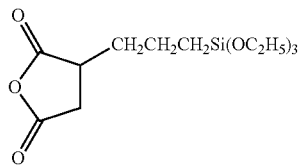

acetamidopropyltrimethoxysilane of formula $H_3C-C(O)NH-CH_2CH_2CH_2-Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional compounds (M) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetra-isooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Mixtures of one or more functional compounds (M) and one or more non-functional compound (M) can be used in the process of the invention. Otherwise functional compound(s) (M) or non-functional compound(s) (M) can be separately used.

The amount of the compound (M) used in the process of the invention is such that the mixture of step (i) comprises advantageously at least 0.1% by weight, preferably at least 1% by weight, more preferably at least 5% by weight of said compound (M) based on the total weight of the polymer (F) and the compound (M) in said mixture.

The amount of the compound (M) used in the process of the invention is such that the mixture of step (i) comprises advantageously at most 95% by weight, preferably at most 75% by weight, more preferably at most 55% by weight of said compound (M) based on the total weight of the polymer (F) and the compound (M) in said mixture.

The amount of hydrolysed and/or polycondensed compound (M) in the fluoropolymer film of the present invention is advantageously at least 0.1% by weight, preferably at least 1% by weight, more preferably at least 5% by weight of said compound (M) based on the total weight of the polymer (F) and the hydrolysed and/or polycondensed compound (M) in said fluoropolymer film.

The amount of hydrolysed and/or polycondensed compound (M) in the fluoropolymer film of the present invention is advantageously at most 95% by weight, preferably at most 75% by weight, more preferably at most 55% by weight of said compound (M) based on the total weight of the polymer (F) and the hydrolysed and/or polycondensed compound (M) in said fluoropolymer film.

By the term "liquid medium", it is hereby intended to denote a medium which exists in the liquid state at 20° C. under atmospheric pressure.

By the term "ionic liquid (IL)", it is hereby intended to denote a compound formed by the combination of positively charged cations and negatively charged anions which exists in the liquid state at temperatures below 100° C. under atmospheric pressure.

The ionic liquid (IL) is typically selected from protic ionic liquid ($IL_p$) and aprotic ionic liquids ($IL_a$).

By the term "protic ionic liquid ($IL_p$)", it is hereby intended to denote an ionic liquid wherein the cation comprises one or more $H^+$ hydrogen ions.

Non-limitative examples of cations comprising one or more $H^+$ hydrogen ions include, notably, imidazolium, pyridinium, pyrrolidinium or piperidinium rings, wherein the nitrogen atom carrying the positive charge is bound to a $H^+$ hydrogen ion.

By the term "aprotic ionic liquid ($IL_a$)", it is hereby intended to denote an ionic liquid wherein the cation is free of $H^+$ hydrogen ions.

The liquid medium typically consists essentially of at least one ionic liquid (IL) and, optionally, at least one additive (A), wherein said ionic liquid (IL) is selected from protic ionic liquids ($IL_p$), aprotic ionic liquids ($IL_a$) and mixtures thereof.

The ionic liquid (IL) is typically selected from those comprising as cation a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms.

Within the meaning of the present invention, by the term "alkyl group" it is meant saturated hydrocarbon chains or those carrying one or more double bonds and containing 1 to 30 carbon atoms, advantageously 1 to 18 carbon atoms and even more advantageously 1 to 8 carbon atoms. There can be mentioned by way of example the methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In an advantageous embodiment of the present invention, the cation of the ionic liquid (IL) is selected from the followings:

a pyrrolidinium ring of formula (III) here below:

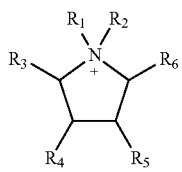

(III)

wherein $R_1$ and $R_2$ each represent independently an alkyl group with 1 to 8 carbon atoms and $R_3$, $R_4$, $R_5$ and $R_6$ each represent independently a hydrogen atom or an alkyl group with 1 to 30 carbon atoms, advantageously 1 to 18 carbon atoms, also more advantageously 1 to 8 carbon atoms, and a piperidinium ring of formula (IV) here below:

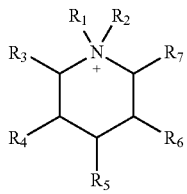

(IV)

wherein $R_1$ and $R_2$ each represent independently of each other an alkyl group with 1 to 8 carbon atoms and $R_3$ to $R_7$ each represent independently of each other a hydrogen atom or an alkyl group with 1 to 30 carbon atoms, advantageously 1 to 18 carbon atoms, even more advantageously 1 to 8 carbon atoms.

In a particularly advantageous embodiment of the present invention, the cation of the ionic liquid (IL) is selected from the followings:

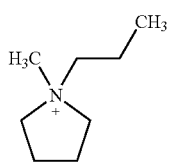

(III-a)

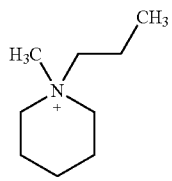

(IV-a)

The ionic liquid (IL) is advantageously selected from those comprising as anion those chosen from halides anions, perfluorinated anions and borates.

The halide anions are in particular selected from the following anions: chloride, bromide, fluoride or iodide.

In a particularly advantageous embodiment of the present invention, the anion of the ionic liquid (IL) is selected from the followings:

bis(trifluoromethylsulphonyl)imide of formula $(SO_2CF_3)_2N^-$,
hexafluorophosphate of formula $PF_6^-$,
tetrafluoroborate of formula $BF_4^-$, and
oxaloborate of formula:

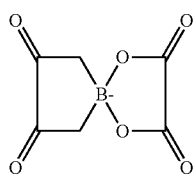 [SMILES: O=C1C[B-]2(CC1=O)OC(=O)C(=O)O2]

The amount of one or more ionic liquids (IL) in the liquid medium used in the process of the invention is such that the mixture of step (i) comprises advantageously at least 1% by weight, preferably at least 5% by weight, more preferably at least 10% by weight of ionic liquids (IL) based on the total weight of the polymer (F) and the ionic liquid (IL) in said mixture.

The amount of one or more ionic liquids (IL) in the liquid medium used in the process of the invention is such that the mixture of step (i) comprises advantageously at most 95% by weight, preferably at most 85% by weight, more preferably at most 75% by weight of ionic liquids (IL) based on the total weight of the polymer (F) and the ionic liquid (IL) in said mixture.

Should one or more additives (A) be present in the liquid medium, non-limitative examples of suitable additives (A) include, notably, those which are soluble in the liquid medium.

Without being bound by this theory, the Applicant believes that, in the presence of one or more additives (A) in said liquid medium, the viscosity of the mixture of step (i) of the process of the invention can be advantageously decreased, thus leading to a fluoropolymer film advantageously having an improved ionic conductivity.

The additive (A) is preferably selected from the group consisting of organic carbonates such as ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

The amount of one or more additives (A), if any, in the liquid medium is typically comprised between 0.1% and 95% by weight, preferably between 1.0% and 70% by weight, more preferably between 5.0% and 50% by weight, based on the total weight of the liquid medium.

By the term "electrolytic salt (ES)", it is hereby intended to denote a metal salt comprising electrically conductive ions.

A variety of metal salts may be employed as electrolytic salts (ES). Metal salts which are stable and soluble in the chosen ionic liquid (IL) medium are generally used.

Non-limitative examples of suitable electrolytic salts (ES) include, notably, MeI, $Me(PF_6)_n$, $Me(BF_4)_n$, $Me(ClO_4)_n$, $Me(bis(oxalato)borate)_n$ ("Me(BOB) n"), $MeCF_3SO_3$, $Me[N(CF_3SO_2)_2]n$, $Me[N(C_2F_5SO_2)_2]_n$, $Me[N(CF_3SO_2)(R_F SO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

Preferred electrolytic salts (ES) are selected from the followings: LiI, $LiPF_6$, $LiBF_4$, $LiClO_4$, lithium bis(oxalato) borate ("LiBOB"), $LiCF_3SO_3$, $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The mixture of step (i) of the process of the invention may optionally comprise one or more organic solvents (S).

The selection of the organic solvent (S) is not critical, provided that it efficiently solvates both the polymer (F) and the compound (M) and does not interfere with the reaction between the hydroxyl groups of the polymer (F) and the hydrolysable groups Y of the compound (M).

Should one or more organic solvents (S) be present, the organic solvent (S) is generally selected from the group consisting of ketones, including lower ketones such as acetone, methylethylketone and higher ketones, such as isophorone, methyl isobutyl ketone (MIK), cyclohexanone, diisobutyl ketone; amides such as N,N-dimethylformamide (DMF), N,N-dimethylacetamide, tetramethyl urea; polar aprotic solvents comprising oxygen and/or nitrogen heteroatom(s), such as dimethylsulfoxide (DMSO), tetrahydrofuran (THF), N-methyl-2-pyrrolidone (NMP); organic phosphates such as trimethyl phosphate, triethyl phosphate and mixtures thereof.

The organic solvent (S) is more preferably selected from ketones, amides, polar aprotic solvents comprising oxygen and/or nitrogen heteroatom(s) and mixtures thereof.

Should one or more organic solvents (S) be present, the weight ratio between the polymer (F) and the sum of the polymer (F) and the organic solvent (S) is typically comprised between 0.1 and 0.9, preferably between 0.05 and 0.5, more preferably between 0.08 and 0.25.

Upper limit is not particularly limited, being nevertheless understood that, after the drying and, optionally, curing step (iv), the amount of one or more organic solvents (S), if any, which is stably incorporated and retained in the fluoropolymer film will be of at most 10% by weight, preferably of at most 5% by weight, more preferably of at most 1% by weight, even more preferably of at most 0.2% by weight based on the weight of polymer (F).

Generally, in the step (i) of the process of the invention, a mixture of the liquid medium and, optionally, one or more electrolytic salts (ES) is preliminarily prepared.

One or more electrolytic salts (ES), if any, are generally dissolved in the liquid medium so as to provide an electrolyte solution wherein the concentration of the electrolyte is of advantageously at least 0.01 M, preferably at least 0.025 M, more preferably at least 0.05 M and of at most 1 M, preferably 0.75 M, more preferably 0.5 M.

Should the polymer (F) be a grafted fluoropolymer [polymer (Fg)] as defined above, in step (ii) of the process of the invention the compound (M) and the pendant groups of formula $-Y_{m-1}AX_{4-m}$ as defined above are hydrolysed and/or polycondensed to yield a liquid mixture comprising fluoropolymer hybrid organic/inorganic composite comprising inorganic domains and incorporating the liquid medium.

Should the polymer (F) comprise recurring units derived from at least one monomer (MA) having formula (I) as defined above, several techniques can be successfully used for reacting hydroxyl groups of polymer (F) with hydrolysable group(s) (Y) of compound (M).

The polymer (F) comprising recurring units derived from at least one monomer (MA) having formula (I) as defined above and the compound (M) can be notably reacted in molten phase.

Should they be reacted in molten phase, the mixture of step (i) of the process of the invention preferably does not comprise any organic solvents (S).

Melt compounders such as extruders, melt kneaders or other devices can be advantageously used to this aim.

The polymer (F) comprising recurring units derived from at least one monomer (MA) having formula (I) as defined above and the compound (M) can be also notably reacted in liquid phase.

Should they be reacted in liquid phase, the mixture of step (i) of the process of the invention may comprise at least one organic solvent (S).

When they are reacted in liquid phase, mixing can be accomplished at room temperature (about 25° C.) or upon heating.

According to an embodiment of the invention, the mixture of step (i) of the process of the invention can further comprise at least one inorganic filler (I).

The addition of such inorganic filler (I) will enable advantageously obtaining fluoropolymer films having improved mechanical properties.

The inorganic filler (I) is generally provided in the mixture under the form of particles.

The inorganic filler (I) particles generally have an average particles size of 0.001 μm to 1000 μm, preferably of 0.01 μm to 800 μm, more preferably of 0.03 μm to 500 μm.

The choice of the inorganic filler (I) is not particularly limited; nevertheless, inorganic fillers having on their surface reactive groups towards compound (M) are generally preferred.

Among surface reactive groups, mention can be notably made of hydroxyl groups.

Without being bound by this theory, the Applicant believes that reaction between at least a fraction of compound (M) with at least a fraction of said surface reactive group of the inorganic filler (I) can occur simultaneously with the reaction of at least a fraction of compound (M) with at least a fraction of the $R_{OH}$ groups of the monomer (MA), should the polymer (F) comprise recurring units derived from at least one monomer (MA) having formula (I) as defined above, so that in subsequent hydrolysis and/or polycondensation step, chemical bonding between the polymer (F) and the inorganic filler is likely achieved through the inorganic domains derived from compound (M).

Among inorganic fillers (I) suitable for being used in the process of the invention, mention can be made of inorganic oxides, including mixed oxides, metal sulphates, metal carbonates, metal sulfides and the like.

Among metal oxides, mention can be made of $SiO_2$, $TiO_2$, ZnO, $Al_2O_3$.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates are generally known as possessing a layered structure.

These silicates, aluminium-silicates and magnesium silicates, all optionally containing additional metals such as sodium, potassium, iron or lithium can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium can be selected among synthetic clays, like notably fluorohectorite, hectorite, laponite.

According to this embodiment, the fluoropolymer film obtained by the process of the present invention will comprise said inorganic fillers (I) in the inorganic domains of the fluoropolymer hybrid organic/inorganic composites.

Should the polymer (F) comprise recurring units derived from at least one monomer (MA) having formula (I) as defined above, the hydrolysis and/or polycondensation of step (ii) of the process of the invention can be carried out simultaneously to the step of reacting hydroxyl groups of polymer (F) and hydrolysable group(s) (Y) of compound (M) or can be carried out once said reaction has occurred.

Typically, in particular for compounds wherein A is Si, this hydrolysis and/or polycondensation is initiated by addition of at least one appropriate catalyst and/or reactant. Generally, water or a mixture of water and an acid can be used for promoting this reaction.

The choice of the acid is not particularly limited; both organic and inorganic acids can be used. Formic acid is among the preferred acids which can be used in the process of the invention.

Generally, the addition of an aqueous medium preferably comprising an acid will be the preferred method for promoting the hydrolysis and/or polycondensation.

While this hydrolysis and/or polycondensation can take place at room temperature (25° C.), it is generally preferred to carry out this step upon heating at a temperature exceeding 50° C.

Actual temperatures will be selected having regards to the boiling point and/or stability of the organic solvent (S), if any. Generally, temperatures between 20° C. and 150° C., preferably between 40° C. and 120° C. will be preferred.

It is understood that in step (ii) of the process of the invention hydrolysable group(s) Y of the compound (M) and, optionally, of pendant groups of formula $-Y_{m-1}AX_{4-m}$ as defined above will react so as to yield a hybrid composite comprising polymer domains consisting of chains of polymer (F) and inorganic domains consisting of residues derived from compound (M).

As this will be recognized by the skilled in the art, the hydrolysis and/or polycondensation reaction generally generate low molecular weight side products, which can be notably water or alcohol, as a function of the nature of the metal compound (M).

It is further understood that while the hydrolysis and/or polycondensation reaction is initiated in step (ii), said reaction will continue during step (iii) and, more particularly, during step (iv), as detailed below.

The process of the invention comprises a step (iii) of processing a film from the liquid mixture obtained in step (ii).

Techniques for processing a film from a liquid mixture are known in the art; the liquid mixture of step (ii) is typically processed by casting.

Should the liquid mixture be processed by casting, it is typically applied by spreading on a support surface using standard devices, according to well-known techniques like doctor blade coating, metering rod (or Meyer rod) coating, slot die coating, knife over roll coating or "gap coating", and the like.

The choice of the support surface is not particularly limited, being understood that the fluoropolymer film can be manufactured directly as an unitary assembly or can be manufactured by casting onto another support surface, from which said fluoropolymer film can be detached and individualized.

The support surface is typically made of a composition comprising:
  at least one polymer (F) as defined above, said polymer (F) having a melting temperature of at least 180° C., preferably of at least 200° C.; and
  from 0.1% to 30% by weight, preferably from 1% to 10% by weight of mica.

The melting temperature is determined by Differential Scanning calorimetry (DSC) at a heating rate of 10° C./min, according to ASTM D 3418.

The support surface is preferably made of a composition comprising:
  at least one polymer (F) selected from the group consisting of homopolymers of CTFE, copolymers of CTFE with at least one fluorinated monomer as defined above and polymers (F-1) as defined above, said polymer (F) having a melting temperature of at least 180° C., preferably of at least 200° C.; and
  from 0.1% to 30% by weight, preferably from 1% to 10% by weight of mica.

The support surface is more preferably made of a composition comprising:
  at least one polymer (F-1) comprising recurring units derived from at least one per(halo)fluoromonomer selected from TFE and CTFE and from at least one hydrogenated comonomer selected from ethylene, propylene and isobutylene, optionally containing one or more additional comonomers, typically in amounts of from 0.1% to 30% by moles, based on the total amount of TFE and/or CTFE and said hydrogenated comonomer(s),
said polymer (F-1) having a melting temperature of at least 180° C., preferably of at least 200° C.; and
  from 0.1% to 30% by weight, preferably from 1% to 10% by weight of mica.

The support surface is even more preferably made of a composition comprising:
  at least one polymer (F-1) comprising:
(a) from 35% to 65%, preferably from 45% to 55% by moles of ethylene (E); and
(b) from 65% to 35%, preferably from 55% to 45% by moles of at least one of chlorotrifluoroethylene (CTFE) and tetrafluoroethylene (TFE) or mixture thereof; and
(c) optionally, from 0.1% to 30% by moles, based on the total amount of TFE and/or CTFE and ethylene, of one or more additional comonomers, said polymer (F-1) having a melting temperature of at least 180° C., preferably of at least 200° C.; and from 0.1% to 30% by weight, preferably from 1% to 10% by weight of mica.

The support surface is most preferably made of a composition comprising:
at least one polymer (F-1) comprising:
(a) from 35% to 65%, preferably from 45% to 55% by moles of ethylene (E); and
(b) from 65% to 35%, preferably from 55% to 45% by moles of chlorotrifluoroethylene (CTFE); and
(c) optionally, from 0.1% to 30% by moles, based on the total amount of CTFE and ethylene, of one or more additional comonomers, said polymer (F-1) having a melting temperature of at least 180° C., preferably of at least 200° C.; and
from 0.1% to 30% by weight, preferably from 1% to 10% by weight of mica.

It has been found that by using such most preferred support surface the fluoropolymer film processed under step (iii) of the process of the invention can be advantageously easily detached and individualized from said support while leaving its surface advantageously homogeneous and free of defects.

The process of the invention finally comprises a step (iv) of drying and then, optionally, curing the film obtained in step (iii) for obtaining the fluoropolymer film.

Drying can be performed under modified atmosphere, e.g. under an inert gas, typically exempt notably from moisture (water vapour content of less than 0.001% v/v), or can be performed under vacuum.

Further, drying step (iv) can be performed at room temperature (about 25° C.) or at a temperature exceeding 25° C., this latter condition being generally preferred.

It is also understood that under drying conditions, above mentioned low molecular weight side products generated by the hydrolysis and/or polycondensation reaction (which can be notably water or alcohol, as a function of the nature of the metal compound (M)) are at least partially removed from the fluoropolymer film, possibly further promoting, by combined action of heat and side products removal, additional hydrolysis and/or polycondensation.

Drying temperature will be selected so as to effect removal by evaporation of one or more organic solvents (S), if any.

Also, curing step (iv), if any, can be performed at temperatures comprised between 100° C. and 250° C., preferably between 120° C. and 200° C.

Should the fluoropolymer film of the invention comprise at least one electrolytic salt (ES) as defined above, it can be advantageously used as polymer electrolyte separator in electrochemical and photo-electrochemical devices.

Non-limitative examples of suitable electrochemical devices include, notably, secondary batteries, especially Lithium-ion batteries and Lithium-Sulfur batteries, and capacitors, especially Lithium-ion capacitors.

Among preferred electrolytic salts (ES) for the fluoropolymer film for use in Lithium-ion batteries mention can be made of $LiPF_6$, $LiBF_4$, $LiClO_4$, lithium bis(oxalato)borate ("LiBOB"), $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The invention further pertains to a metal-ion secondary battery comprising as polymer electrolyte separator the fluoropolymer film as defined above, said fluoropolymer film comprising at least one electrolytic salt (ES) as defined above.

The metal-ion secondary battery is generally formed by assembling a negative electrode (cathode), the fluoropolymer film as defined above and a positive electrode (anode).

The metal-ion secondary battery is preferably an alkaline or alkaline-earth secondary battery.

Representative cathode (negative electrodes) materials of alkaline or alkaline-earth secondary batteries include:
graphitic carbons able to intercalate alkaline or alkaline-earth metal, typically existing in forms such as powders, flakes, fibers or spheres (for example, mesocarbon microbeads) hosting at least one alkaline or alkaline-earth metal;
alkaline or alkaline-earth metal;
alkaline or alkaline-earth metal alloy compositions, including silicon-based alloys, germanium-based alloys;
alkaline or alkaline-earth metal titanates, advantageously suitable for intercalating alkaline or alkaline-earth metal with no induced strain.

The metal-ion secondary battery is more preferably a Lithium-ion secondary battery, wherein the negative electrode material is selected from the group consisting of:
graphitic carbons able to intercalate lithium, typically existing in forms such as powders, flakes, fibers or spheres (for example, mesocarbon microbeads) hosting lithium;
lithium metal;
lithium alloy compositions, including notably those described in U.S. Pat. No. 6,203,944 (3M INNOVATIVE PROPERTIES CO.) Mar. 20, 2001 and/or in WO 00/03444 (MINNESOTA MINING AND MANUFACTURING) Jun. 10, 2005;
lithium titanates, generally represented by formula $Li_4Ti_5O_{12}$; these compounds are generally considered as "zero-strain" insertion materials, having low level of physical expansion upon taking up the mobile ions, i.e. $Li^+$;
lithium-silicon alloys, generally known as lithium silicides with high Li/Si ratios, in particular lithium silicides of formula $Li_{4.4}Si$;
lithium-germanium alloys, including crystalline phases of formula $Li_{4.4}Ge$.

The negative electrode may contain additives as will be familiar to those skilled in the art. Among them, mention can be made notably of carbon black, graphene or carbon nanotubes. As will be appreciated by those skilled in the art, the negative electrode or cathode may be in any convenient form including foils, plates, rods, pastes or as a composite made by forming a coating of the negative electrode material on a conductive current collector or other suitable support.

Representative anode (positive electrodes) materials of alkaline or alkaline-earth secondary batteries include composites comprising a polymer binder (PB), a powdery electrode material and, optionally, an electroconductivity-imparting additive and/or a viscosity modifying agent.

In the case of forming a positive electrode for a Lithium-ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$. An electroconductivity-imparting additive may be added in order to improve the conductivity of a resultant composite electrode, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminum.

As per the polymer binder (PB), polymers well known in the art can be used including, preferably, vinylidene fluoride (VDF) polymers and even more particularly, VDF polymers comprising recurring units derived from VDF and from 0.01% to 5% by moles of recurring units derived from at least one (meth)acrylic monomer (MA) of formula (I) as defined above.

The invention also pertains to a metal-ion capacitor comprising as polymer electrolyte separator the fluoropolymer film as defined above, said fluoropolymer film comprising at least one electrolytic salt (ES) as defined above.

The metal-ion capacitor is preferably a Lithium-ion capacitor.

Non-limitative examples of suitable photo-electrochemical devices include, notably, dye-sensitized solar cells, photocromic devices and electrochromic devices.

The invention further pertains to a dye-sensitized solar cell comprising as polymer electrolyte separator the fluoropolymer film of the invention, said fluoropolymer film comprising at least one electrolytic salt (ES) as defined above.

The dye-sensitized solar cell is generally formed by assembling a metal support to which there is applied a metal oxide semiconductor layer, such as a $TiO_2$ semiconductor layer, said metal oxide semiconductor layer being coated with a dye layer, the fluoropolymer film as defined above and a conductive electrode.

Non-limitative examples of suitable dyes include, notably, ruthenium and osmium-based dyes such as ruthenium tris (2,2'-bipyridyl-4,4'-dicarboxylate), ruthenium cis-diaqua bipyridyl complexes such as ruthenium cis diaqua bis (2,2'-bipyridyl-4,4'-dicarboxylate), porphyrins such as zinc tetra (4-carboxyphenyl) porphyrin, cyanides such as iron-hexacyanide complexes and phthalocyanines.

The dye-sensitized solar cell is typically closed at the top and at the bottom by an insulating layer, wherein the conductive electrode and the insulated layer on the top of the cell must be optically transparent to solar radiation.

Among preferred electrolytic salts (ES) for the fluoropolymer film for use in dye-sensitized solar cells mention can be made of redox electrolytes such as iodide/triiodide couples and disulfide/thiolate couples.

The invention further pertains to a photochromic device comprising as polymer electrolyte separator the fluoropolymer film of the invention, said fluoropolymer film comprising at least one electrolytic salt (ES) as defined above.

The photochromic device is generally formed by assembling a first conducting electrode opposing a second conducting electrode, wherein at least one of said conducting electrodes is optically transparent to solar radiation, a radiation sensitive electrode disposed on an opposing surface of said first conducting electrode, an ion intercalative electrode disposed on an opposing surface of said second conducting electrode and the fluoropolymer film as defined above, said fluoropolymer film being disposed between said radiation sensitive electrode and said ion intercalative electrode.

Among preferred electrolytic salts (ES) for the fluoropolymer film for use in photochromic devices mention can be made of metal salts such as lithium, sodium potassium, rubidium, silver and caesium salts, preferably $LiClO_4$, $Li(CF_3SO_3)$ and lithium iodide.

Non-limitative examples of suitable radiation sensitive electrodes include, notably, semiconductors such as II-VI, III-V and II-V elemental and compound semiconductors and transition metal compounds, preferably metal oxides, metal sulfides and metal selenides.

The radiation sensitive electrode may further comprise organic or inorganic dyes which absorb at least a part of solar radiation.

Non-limitative examples of suitable ion intercalative electrodes include, notably, those comprised of inorganic materials, organic materials or blends and composites of inorganic and organic ion intercalatable materials, preferably those comprised of $WO_3$ or $MoO_3$ or their alkali metal (e.g., Li, K, Na, Rb or Cs) tungstates or molybdates, optionally containing up to 30% by moles of transition metals (e.g., Ti, Cr, V, Mn, Co and the like).

The invention further pertains to an electrochromic device comprising as polymer electrolyte separator the fluoropolymer film of the invention, said fluoropolymer film comprising at least one electrolytic salt (ES) as defined above.

The electrochromic device is generally formed by assembling a conducting electrode opposing a counter electrode wherein an electrochemically active material layer, a selective ion transport layer and the fluoropolymer film as defined above are sequentially disposed between said conducting electrode and said counter conducting electrode. At least one of the electrodes is optically transparent to solar radiation.

Among preferred electrolytic salts (ES) for the fluoropolymer film for use in electrochromic devices mention can be made of metal salts such as lithium, sodium, potassium, rubidium, silver and caesium salts, preferably $LiClO_4$, $LiBF_4$, $LiCF_3SO_3$, $LiN(CF_3SO_2)_2$ and lithium iodide.

Non-limitative examples of suitable electrochemically active material layers include, notably, inorganic, organic or blends and composites of inorganic and organic electrochemically active materials, preferably polyaniline and its derivatives, $WO_3$, $MoO_3$ and $WO_3$ and $MoO_3$ doped with oxides of lithium, sodium, potassium, molybdenum, vanadium or titanium.

Non-limitative examples of suitable selective ion transport layers include, notably, those preventing the oxidized species in the polymer electrolyte separator from contacting reduced electrochemical material layer.

Should the fluoropolymer film of the invention comprise a liquid medium consisting essentially of at least one protic ionic liquid ($IL_p$) and, optionally, at least one additive (A), it can be advantageously used as polymer separator in fuel cell devices.

The invention further pertains to a fuel cell device comprising as polymer separator the fluoropolymer film of the invention, said fluoropolymer film comprising a liquid medium consisting essentially of at least one protic ionic liquid ($IL_p$) and, optionally, at least one additive (A).

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Raw Materials

VDF/HEA copolymer having a melt flow index of 9.3 g/10 min as measured according to ASTM D1238 (190° C., 5 Kg).

SOLEF® 6008 VDF homopolymer having a melt flow index of 8.5 g/10 min as measured according to ASTM D1238 (190° C., 5 Kg).

N-Propyl-N-methylpyrrolidinium bis(trifluoromethanesulfonyl)imide (Pyr13TFSI) [ionic liquid (IL-1)] of formula:

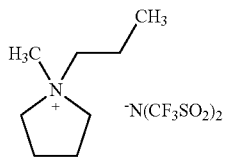

Lithium bis(trifluoromethanesulfonyl)imide (LiTFSI) [electrolytic salt (ES-1)]

Measurement of the Ionic Conductivity ($\sigma$)

The solid electrolyte separator is placed in a ½ inch stainless steel Swagelok-cell prototype. The resistance of the solid polymer electrolyte separator was measured and the ionic conductivity ($\sigma$) was obtained using the following equation:

$$\sigma = \frac{d}{(R_b \times S)}$$

wherein d is the thickness of the film, $R_b$ the bulk resistance and S is the area of the stainless steel electrode.

Measurement of Flexibility of the Film

The maximum angle of a film of about 1.5 mm of thickness and of size 10×20 mm which is bended until it breaks was measured at room temperature. The higher the maximum flexion angle to which the film resists bending without cracking, the more flexible it is. A maximum flexion angle of 0° denotes that the film is not flexible.

Also, the higher the maximum flexion angle to which the film resists bending without cracking, the higher its mechanical integrity. A good mechanical integrity of the film was observed at a maximum flexion angle above 100°.

Measurement of Tensile Properties of the Film

The elongation at break was measured by tensile testing at 23° C. according to ASTM D638 standard test method (specimen of type V, grip distance=25.4 mm, Lo=21.5 mm, 1-50 mm/min).

EXAMPLE 1: MANUFACTURE OF THE FLUOROPOLYMER FILM WITH VDF/HEA COPOLYMER

The dissolution of VDF/HEA copolymer (0.4 g) was carried out in DMF (4 g) (10% by weight) during one night at room temperature.

An electrolyte solution was formed by the mixture of the electrolytic salt (ES-1) and the ionic liquid (IL-1) with the following relative amount: 0.5 M of LiTFSI in Pyr13TFSI. The electrolyte solution so obtained had an ionic conductivity of 2.4×10$^{-3}$ S/cm at 25° C.

The electrolyte solution (1 g) and tetraethoxysilane (TEOS) (0.38 g) were added to the VDF/HEA copolymer solution and stirred during 10 minutes at room temperature. A mixture was obtained containing 27% by volume (32% by weight) of VDF/HEA copolymer, 64% by volume (60% by weight) of the electrolyte solution and 9% by volume (8% by weight) of SiO$_2$ (equivalent amount of TEOS fully condensated).

0.64 g of formic acid were then added to the mixture and the mixture was stirred during 2 minutes at room temperature.

The mixture was poured into a mold.

The condensation reaction was followed by weight loss. Then a thermal post-processing at 150° C. during 40 minutes under ambient atmosphere was performed.

The fluoropolymer film so obtained had an ionic conductivity of 3.2×10$^{-4}$ S/cm.

No break was observed up to a flexion angle of 175°.

EXAMPLE 2: MANUFACTURE OF THE FLUOROPOLYMER FILM WITH SOLEF® 6008 VDF HOMOPOLYMER

The same preparation procedure as detailed in Example 1 was followed but the VDF/HEA copolymer was replaced with SOLEF® 6008 VDF homopolymer.

The fluoropolymer film so obtained had an ionic conductivity of 2.3×10$^{-4}$ S/cm.

A breaking point was observed at a flexion angle of 110°.

EXAMPLE 3: MANUFACTURE OF THE FLUOROPOLYMER FILM WITH VDF/HEA COPOLYMER

The same procedure as detailed in Example 1 was followed but using a mixture containing 18.7% by volume (22.1% by weight) of VDF/HEA copolymer, 75% by volume (70.3% by weight) of the electrolyte solution and 6.3% by volume (5.6% by weight) of SiO$_2$ (equivalent amount of TEOS fully condensated).

The fluoropolymer film so obtained had an ionic conductivity of 4.6×10$^{-4}$ S/cm.

A breaking point was observed at an angle of 150°.

EXAMPLE 4: MANUFACTURE OF THE FLUOROPOLYMER FILM WITH VDF/HEA COPOLYMER

The same procedure as detailed in Example 1 was followed but using a mixture containing 11.3% by volume (13.9% by weight) of VDF/HEA copolymer, 85% by volume (82.5% by weight) of the electrolyte solution and 3.7% by volume (3.8% by weight) of SiO$_2$ (equivalent amount of TEOS fully condensated).

The fluoropolymer film so obtained had an ionic conductivity of 1.5×10$^{-3}$ S/cm.

EXAMPLE 5: MANUFACTURE OF THE FLUOROPOLYMER FILM WITH VDF/HEA COPOLYMER

The same procedure as detailed in Example 1 was followed but using a mixture containing 35% by volume of VDF/HEA copolymer, 64% by volume of the electrolyte solution and 1% by volume of SiO$_2$.

The fluoropolymer film so obtained had an ionic conductivity of 1.0×10$^{-4}$ S/cm.

No break was observed up to a flexion angle of 175°.

EXAMPLE 6: MANUFACTURE OF THE FLUOROPOLYMER FILM WITH VDF/HEA COPOLYMER

The same procedure as detailed in Example 5 was followed but a fluoropolymer film was obtained having a thickness of about 20 μm was obtained.

The fluoropolymer film so obtained had an ionic conductivity of $1.2 \times 10^{-4}$ S/cm.

No break was observed upon flexion. The elongation at break of the fluoropolymer film was 155%.

The fluoropolymer film had an optical transparency over 85% between 250 nm and 1000 nm.

COMPARATIVE EXAMPLE 1

The same procedure as detailed in Example 1 was followed but replacing the VDF/HEA copolymer with TEOS and using a mixture containing 64% by volume (60% by weight) of the electrolyte solution and 36% by volume (40% by weight) of $SiO_2$ (equivalent amount of TEOS fully condensed). A breaking point was observed at an angle of 0°.

COMPARATIVE EXAMPLE 2

The same procedure as detailed in Example 1 was followed but replacing the VDF/HEA copolymer with TEOS and using a mixture containing 87.7% by volume of the electrolyte solution and 12.3% by volume of $SiO_2$ (equivalent amount of TEOS fully condensed).

A breaking point was observed at an angle of 0°.

COMPARATIVE EXAMPLE 3

The fluoropolymer film obtained according to Example 1 was subjected to extraction of the ionic liquid (IL-1) by acetonitrile Soxhlet washing. Pore size was characterized by nitrogen adsoption-desorption: BJH calculation led to pore diameters of 2.1 nm.

The resulting material after Soxhlet extraction was not flexible.

EXAMPLE 7: MANUFACTURE OF LI-ION BATTERY

A battery prototype was manufactured consisting of a cylindrical ½ inch stainless steel Swagelok® wherein the positive electrode was a $LiFePO_4$ based electrode, the negative electrode was Lithium metal and the polymer electrolyte separator was the fluoropolymer film obtained according to Example 3. No additional electrolyte solution was added. Galvanostatic curves obtained during cycling at C/5 rate and 23° C. for an electrochemical window of 2-4.2 V demonstrated that the fluoropolymer film of the present invention is advantageously suitable for use in Lithium-ion batteries.

Capacity values were advantageously held constant at 45% during 70 cycles.

Processing of the Fluoropolymer Film

It has been found that by using as support surface an ECTFE polymer having a molar ratio of CTFE and ethylene of 50:50 and containing 3% by weight of mica, said ECTFE polymer having a melting point of 240° C. [polymer (S)], the fluoropolymer film processed under step (iii) of the process of the invention is advantageously easily detached and individualized from said support while leaving its surface advantageously homogeneous and free of defects.

Table 1 here below shows the results of the detachment tests from a support surface of fluoropolymer films having a thickness of about 30 μm obtained according to Example 1 of the invention.

TABLE 1

| Support surface | Detachment | Appearance |
| --- | --- | --- |
| Polymer (S) | Possible | Homogeneous |
| Mica | Possible but mica breaks | — |
| Glass | Non possible | — |

It has been found that, by using mica as support surface, the fluoropolymer film obtained according to Example 1 is detached but mica breaks.

It has been also found that, by using glass as support surface, the fluoropolymer film obtained according to Example 1, said film containing a relatively high amount of $SiO_2$ of 9% by volume, is not detached and individualized from said support.

Table 2 here below shows the results of the detachment tests from a support surface of fluoropolymer films having a thickness of about 30 μm obtained according to Example 5 of the invention.

TABLE 2

| Support surface | Detachment | Appearance |
| --- | --- | --- |
| Polymer (S) | Possible | Homogeneous |
| Glass | Possible | — |

It has been found that, by using glass as support surface, the fluoropolymer film obtained according to Example 5, said film containing a relatively low amount of $SiO_2$ of 1% by volume, is detached and individualized from said support.

The invention claimed is:

1. A fluoropolymer film comprising a fluoropolymer hybrid organic/inorganic composite, wherein said hybrid is obtained by a process comprising hydrolysing and/or polycondensing a mixture comprising:
   at least one fluoropolymer [polymer (F)];
   at least one compound [compound (M)] having formula:

$$X_{4-m}AY_m$$

wherein m is an integer from 1 to 4, A is an element selected from the group consisting of Si, Ti and Zr, Y is a hydrolysable group and X is a hydrocarbon group, optionally comprising one or more functional groups; and
   a liquid medium consisting of at least one ionic liquid (IL) and, optionally, at least one additive (A) selected from organic carbonates and mixtures thereof.

2. The fluoropolymer film according to claim 1, wherein polymer (F) is a polymer (F-2) comprising recurring units derived from vinylidene fluoride (VDF) and, optionally, from one or more fluorine-containing monomers different from VDF.

3. The fluoropolymer film according to claim 1, wherein polymer (F) comprises recurring units derived from at least one (meth)acrylic monomer [monomer (MA)] having formula (I):

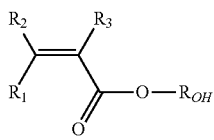

wherein each of $R_1$, $R_2$, $R_3$, equal to or different from each other, is independently a hydrogen atom or a $C_1$-$C_3$ hydrocarbon group and $R_{OH}$ is a $C_1$-$C_5$ hydrocarbon moiety comprising at least one hydroxyl group.

4. The fluoropolymer film according to claim 1, said film further comprising at least one electrolytic salt (ES) different from said ionic liquid (IL).

5. A metal-ion secondary battery comprising as polymer electrolyte separator the fluoropolymer film according to claim 1, said fluoropolymer film comprising at least one electrolytic salt (ES) different from said ionic liquid (IL).

6. A metal-ion capacitor comprising as polymer electrolyte separator the fluoropolymer film according to claim 1, said fluoropolymer film comprising at least one electrolytic salt (ES) different from said ionic liquid (IL).

7. A dye-sensitized solar cell comprising as polymer electrolyte separator the fluoropolymer film according to claim 1, said fluoropolymer film comprising at least one electrolytic salt (ES) different from said ionic liquid (IL).

8. A photochromic device comprising as polymer electrolyte separator the fluoropolymer film according to claim 1, said fluoropolymer film comprising at least one electrolytic salt (ES) different from said ionic liquid (IL).

9. An electrochromic device comprising as polymer electrolyte separator the fluoropolymer film according to claim 1, said fluoropolymer film comprising at least one electrolytic salt (ES) different from said ionic liquid (IL).

10. A fuel cell comprising as polymer separator the fluoropolymer film according to claim 1, said fluoropolymer film comprising a liquid medium consisting essentially of at least one protic ionic liquid ($IL_p$) and, optionally, at least one additive (A) selected from organic carbonates and mixtures thereof.

11. A process for manufacturing the fluoropolymer film according to claim 1, said process comprising:
(i) providing a mixture comprising:
    the at least one fluoropolymer [polymer (F)];
    the at least one compound [compound (M)] having formula:

wherein m is an integer from 1 to 4, A is an element selected from the group consisting of Si, Ti and Zr, Y is a hydrolysable group and X is a hydrocarbon group, optionally comprising one or more functional groups; and
    the liquid medium consisting of at least one ionic liquid (IL) and, optionally, at least one additive (A) selected from the group consisting of organic carbonates and mixtures thereof;
(ii) hydrolysing and/or polycondensing said compound (M) to yield a liquid mixture comprising a fluoropolymer hybrid organic/inorganic composite comprising inorganic domains and incorporating said liquid medium;
(iii) processing a film from the liquid mixture obtained in step (ii); and
(iv) drying and then, optionally, curing the film obtained in step (iii) to obtain the fluoropolymer film.

12. The process according to claim 11, wherein polymer (F) comprises recurring units derived from at least one (meth)acrylic monomer [monomer (MA)] having formula (I):

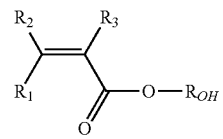

wherein each of $R_1$, $R_2$, $R_3$, equal to or different from each other, is independently a hydrogen atom or a $C_1$-$C_3$ hydrocarbon group and $R_{OH}$ is a $C_1$-$C_5$ hydrocarbon moiety comprising at least one hydroxyl group.

13. The process according to claim 11, wherein the amount of one or more ionic liquids (IL) in the liquid medium is such that the mixture of step (i) comprises at least 1% by weight and at most 95% by weight of ionic liquids (IL) based on the total weight of the polymer (F) and the ionic liquid (IL) in said mixture.

14. The process according to claim 11, wherein the ionic liquid (IL) in the liquid medium is selected from protic ionic liquids ($IL_p$), aprotic ionic liquids ($IL_a$) and mixtures thereof.

15. The process according to claim 11, wherein under step (i) the mixture further comprises:
at least one organic solvent (S) different from said ionic liquid (IL) and said additive (A).

16. The process according to claim 11, wherein under step (iii) the film is manufactured by casting the liquid mixture onto a support surface, said support surface being made of a composition comprising:
at least one polymer (F) having a melting temperature of at least 180° C.; and
from 0.1% to 30% by weight of mica.

17. The process according to claim 13, wherein the mixture of step (i) comprises at least 5% by weight and at most 85% by weight of ionic liquids (IL) based on the total weight of the polymer (F) and the ionic liquid (IL) in said mixture.

18. The process according to claim 13, wherein the mixture of step (i) comprises at least 10% by weight and at most 75% by weight of ionic liquids (IL) based on the total weight of the polymer (F) and the ionic liquid (IL) in said mixture.

19. The process according to claim 16, wherein under step (iii) the film is manufactured by casting the liquid mixture onto a support surface, said support surface being made of a composition comprising:
at least one polymer (F) having a melting temperature of at least 200° C.; and
from 1% to 10% by weight of mica.

* * * * *